Nov. 9, 1954
H. J. JOHNSON
2,693,702
HIGH-PRESSURE LIQUID LEVEL GAUGE
Filed Nov. 14, 1951
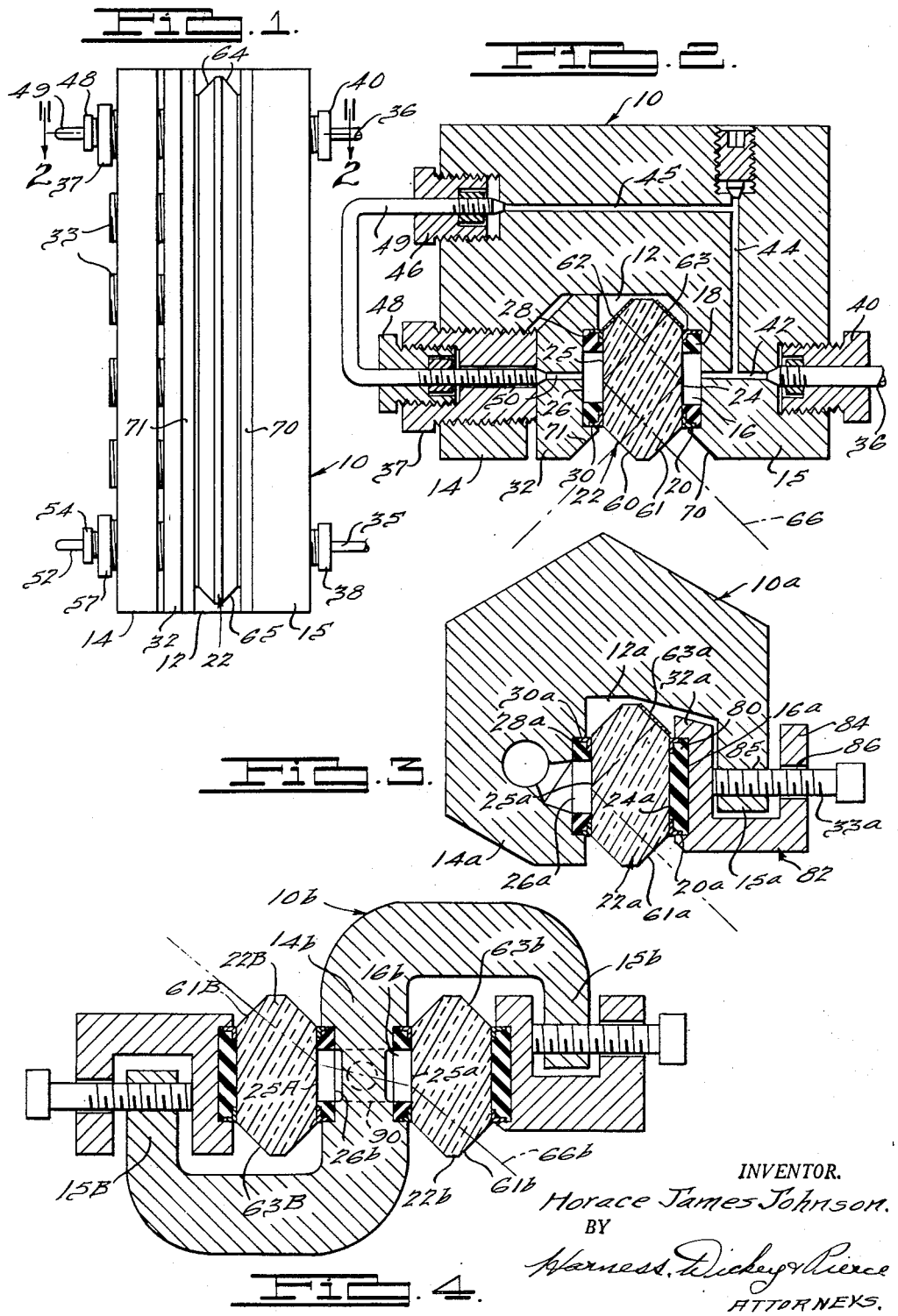
INVENTOR.
Horace James Johnson.
BY
Harness, Dickey & Pierce
ATTORNEYS.

United States Patent Office 2,693,702
Patented Nov. 9, 1954

2,693,702

HIGH-PRESSURE LIQUID LEVEL GAUGE

Horace James Johnson, Grosse Pointe, Mich., assignor to Buffalo Eclipse Corporation, North Tonawanda, N. Y., a corporation of New York Application November 14, 1951, Serial No. 256,285

23 Claims. (Cl. 73—327)

The present invention relates to liquid level gauges of the type having a transparent window permitting direct observation of the liquid.

For many uses (and in some instances under the requirements of the law) such direct view gauges are employed rather than other types which incorporate apparatus for recording and/or transmitting the information as to liquid level, because where the liquid itself can be seen by the operator, there are no parts which can stick or fail in such a way as to cause a false reading. An important object of this invention is to provide such a direct view liquid level gauge which is safely operable at pressures substantially above those which presently known types can withstand.

Another object is to provide such an improved liquid level gauge operable at extremely high pressures, which affords an uninterrupted view of the liquid chamber throughout the full height of the area to be gauged.

Another object is to provide an improved liquid level gauge of the indicated character wherein stresses applied to the gauge window glass are entirely compressive in character and wherein the gauge glass is so formed and the elements which bear against the glass are so designed and arranged that the glass will withstand substantially higher fluid pressures than can safely be applied to gauges of designs heretofore known.

An additional object of this invention is to provide an improved liquid level gauge which is not only stronger in its resistance to high pressures than presently known gauges, but the strength of which is independent of the length of the gauge, whereby gauges of greater length may be provided without sacrifice of strength and of ability to withstand high pressures.

Still another object is to provide an improved gauge of the so-called "reflex" type wherein, due to the different indices of refraction above and below the liquid level, the light transmitted to the interior is absorbed by the liquid, below the liquid level, but is reflected back to the eyes of the observer above the liquid level so that the space below the liquid level looks dark while the space above the liquid level appears brilliantly mirrorlike, the parts of my improved gauge being so arranged that the reflective surfaces are less subject to destruction by erosion or other attack resulting from the action of the high pressure fluids being gauged.

A further object is to provide an improved transparent-reflection-type gauge, so constructed that the liquid in the gauge is illuminated from the rear, while above the liquid level the fluid chamber appears dark and unilluminated because the line of sight of the observer is reflected into a dark interior portion of the gauge.

Other objects of the invention will become apparent from the present disclosure in its entirety.

Figure 1 is a front elevational view of a liquid level gauge constructed in accordance with the principles of the present invention;

Fig. 2 is a cross-sectional view thereof taken substantially on the line 2—2 of Fig. 1 looking in the direction of the arrows;

Fig. 3 is a cross-sectional view corresponding to Fig. 2 but showing a modified construction; and Fig. 4 is an analogous cross-sectional view of another modified construction.

Referring now to the drawing, and particularly to Figs. 1 and 2, the body of my improved gauge is of channeled form or U-section and is generally designated by the reference numeral 10. The side webs of the body are designated 14 and 15, and the channel therebetween is designated 12. The strength of the body is such that the web portions 14, 15 are incapable of substantial outward deformation under the full pressure to which the gauge is subjected. In one side face of the channel 12, shown at the left in Fig. 2, a flat-bottomed groove 16 is formed. Groove 16 stops short of the upper and lower ends of the body and defines, in conjunction with the gasket and gauge glass, the chamber for the fluid which is to be viewed.

An endless gasket 18, which may be formed of synthetic rubber, is fitted in and completely encircles the space within the groove 16 and projects outwardly therefrom to engage the face 24 of the window glass 22, the glass being somewhat spaced from the grooved face of web 15. The gasket is retained by a circumscribing metal frame 20 of angular section, the gasket and frame preferably projecting into, and outwardly from, the channel 12 and the arrangement of these parts preferably corresponding to the disclosure of Howard D. Yoder application, Serial No. 55,207, filed October 18, 1948. Such a gasket and frame are also shown in my Patent No. 2,566,570, granted September 4, 1951. The gauge window glass 22 is mounted edgewise in the channel 12. One flange of the frame 20 lies flat against face 24 of the glass but such flange of the frame does not entirely cover the gasket 18 so that a part of the gasket also bears against the glass and seals the juncture of the frame 20 and glass. The opposite parallel flat face 25 of the glass is sealed by and bears against a similar gasket 28 and frame 30 which are preferably of the same dimensions and arranged in opposed alignment with respect to the gasket portions 18, 20, the gasket and frame portions 28, 30 being held in a groove 26 corresponding to the groove 16 but formed in a clamping plate 32 interposed between the glass 22 and the web 14. A plurality of clamping screws, as 33, mounted in suitably tapped holes (undesignated) in the web 14 serve to initially position the parts in the assembled relation shown, and take the reaction resulting from the fluid pressure, which is imparted thereto through the plate 32.

In the preferred construction shown, the fluid connections to the lower and upper ends of the gauge are made by means of high pressure tubing 35, 36 connected as through high pressure coupling elements 38, 40 to suitable passages, as 42, which communicate with the liquid chamber groove 16 near the respective ends thereof. Each such passage, as 42 (only the upper passage is shown, but it will be understood that the upper and lower passages and cross-communicating passage systems are alike), communicates with the opposite liquid chamber groove 26. As shown in Fig. 2, communicating passages 44, 45 are formed in the body to transmit fluid pressure from the passage 42 via high pressure couplings 46, 48 and through the upper clamping screw 37 to which the pressure is conducted by means of tubing 49 and through a passage 50 which extends through the clamping plate 32 to the groove 26. The tubing portion at the lower end of the gauge corresponding to the tubing portion 49 is designated 52 in Fig. 1 and is connected by means of a coupling nut 54 carried by the lower clamping screw 57 for the clamping plate 32 to a passage (not shown) corresponding to the passage 50 and extending through the lower portion of the clamping plate.

By virtue of the disclosed arrangement, it will be seen that the pressure of the fluid is applied equally to both sides of the glass 22, the pressures being equalized in the grooves 16, 26. The grooves, gaskets, and fluid chamber spaces are preferably of the same dimensions as well as oppositely aligned. As a result, only compressive forces are exerted on the glass. The fluid pressure is transmitted through the elastic gasketing 18 and 28, and through the gasket retaining frames 20 and 30, which are slidable inwardly and outwardly in their respective grooves 16 and 26, to the flat glass surfaces against which these parts bear, so that the pressure exerted against the glass by the gasketing and gasket retaining frames also corresponds to the fluid pressure, maintaining substantially uniform pressure in opposite directions over the entire opposed flat surfaces 24 and 25 of the glass.

The glass is beveled on all four vertical edges, as indicated at 60, 61, 62 and 63, and also on the upper and lower ends, as indicated at 64 and 65. The beveled projecting surfaces are preferably arranged at or substantially at the angle at which the window glass would tend to shear.

The thickness of the glass and proportioning of the parts are such that a convenient line of sight through the glass, which line of sight is represented, for example, at 66, will extend perpendicularly through one of the exposed beveled surfaces, as 61. In the preferred construction shown in Figs. 1 and 2, the column in groove 16 may also be viewed similarly through the other front beveled face 60.

The rear beveled surfaces 62 and 63 are preferably provided with reflective coatings, and these reflective surfaces are also arranged perpendicularly to the line of propagation of light reflected internally by the faces 24 and 25 of the glass. Thus with a liquid having a suitable index of refraction, and standing at a level in the chamber, the light seen by the observer along the line of sight, as 66, will be largely absorbed, because refracted into the liquid and absorbed in the dark interior, while where gas is present above the liquid level, the light will be reflected internally from the surface 25 to the reflecting surface 33 and back again to the eye of the observer along the incident and reflected lines of sight, giving a bright mirror reflection above the liquid and a sharp line of demarcation between the bright and dark portions, at the liquid level.

It will be noted that the outer corners of the gasket retaining frames 20 and 30 lie substantially at the peripheral edges of the flat faces 24 and 25 of the glass, all the way around. There are accordingly no flat glass areas projecting beyond the frame in any direction, in my preferred construction and since the beveled faces are disposed substantially at the shear angle of the glass, the danger of failure of the glass along the outer corners of the gasket retaining frames is effectively offset.

By virtue of the fact that the gauge body is of C cross section, its resistance to outward strain under the fluid pressure is uniform throughout its length, and the gauge can be made of any length to which the materials are capable of fabrication without sacrifice of strength whereas with conventional gauge constructions having hollow frame-type windows and bodies, even though the sides are tied together at intermediate points as well as at the upper and lower ends, the resistance to deflection cannot be uniform and the resultant unequal stressing of the glass limits the pressures that can be applied without causing failure of the glass. If such gauges are provided with enough bridges to prevent substantial distortion of the indicated character under high pressures, the view of the fluid in the gauge is interrupted, necessitating the use of staggered ports or other multiple gauge arrangements to afford a continuous view of the liquid. Such constructions are not only less convenient to use and more expensive to fabricate but are still incapable of withstanding the pressures to which the gauge of my present invention can be subjected. Gauges constructed in accordance with the present disclosure have been successfully operated at pressures as high as 40,000 p. s. i.

The exposed beveled faces 60 and 61 constitute the window portions through which the observer views the fluid, and the side webs 14, 15 may be chamfered, as indicated at 70 and 71, to provide clearance and afford an unobstructed view.

In the modified construction shown in cross section in Fig. 3 (wherein parts corresponding to those already described are designated by like reference characters distinguished by the addition of the letter "a" to each) the body 10a is also of generally C-section provided on the inner face of one of its side webs 14a with a channellike vertical fluid chamber 26a surrounded in similar fashion by an elastic gasket 28a and an angular gasket retaining frame 30a slidable inwardly and outwardly of the channel so that it may always conform to and bear tightly against the flat face 25a of the gauge glass 22a.

In this construction, the fluid pressure is applied only to one face of the glass, shown at the left in Fig. 3, and an equal and opposite pressure is derived by the reaction against the opposite face 24a of the glass of a resilient pad 80 which may be formed of synthetic rubber or other suitable elastic material, and which is similarly retained in the groove 16a with the aid of a retaining frame 20a.

The pad 80 is backed by an adjustable backing frame member 82 of channel form having one web 32a which projects into the channel 12a and having another web 84 lying outside the web 15a of the main frame, the front edge of the web 15a of the main frame being embraced by the channel 82 and the webs 15a and 84 being provided with a plurality of coaxial apertures 85, 86 respectively. The groove 16a is formed in web 32a. Apertures 85 are internally threaded to receive clamping screws 33a while the apertures 86 are larger than the screws, to provide clearance. The screws 33a, which correspond generally to the screws 33 of the first embodiment, may be tightened sufficiently to apply initial compression to the parts and the screws are spaced closely enough to afford rigid backing to the web 32a, which is further stiffened by the channel formation of the member 82 as a whole.

Connections may be made to the upper and lower ends of the fluid chamber, as, for example, in the manner illustrated in the first embodiment, and the fluid pressure will be exerted uniformly against the face 25a of the glass and uniformly opposed by the reaction of the pad 80 and pad retaining frame 20a against the opposite face 24a of the glass. All of the edges of the glass may be similarly beveled, the beveled face 63a being provided with a reflective surface so that an observer looking through the face 61a will see reflected light above the liquid level, while below the liquid level the absorption of light in the dark fluid chamber will make the liquid containing space appear black.

In Fig. 4, there is illustrated in cross section a further modification of the invention in the form of a transparent-type gauge which may be viewed from opposite sides. The body 10b is of S-section, providing in effect two oppositely facing C-sectioned or channel-type body portions. Inasmuch as the two oppositely facing body portions and the gauge components carried thereby are similar, detailed description of one of the symmetrical halves of the structure will suffice. Parts analogous to components of the embodiments previously described are designated by like reference characters distinguished by the letter "b."

The central web 14b of the body structure contains upon its opposite parallel faces flat-bottomed groovelike fluid chamber-defining portions 16b, 26b, respectively. The opposite fluid channels 16b, 26b, may communicate with each other through a plurality of vertically spaced openings, as 90. Between such openings, the web 14b is uninterrupted so that the parts thereof on opposite sides of the liquid columns are effectively tied together in a manner analogous to the structure disclosed in my Patent No. 2,566,570, although if desired, and if adequate at the pressures to be employed, the liquid chambers 16b and 26b might be interconnected throughout their length, to constitute in effect a single slot-like chamber, with tying portions at the upper and lower ends thereof only to integrate the two parts of the web 14b on each side of such slot.

The gauge glass 22b interposed between the web 14b and the web 15b of the main frame is arranged and supported in a manner corresponding to the mounting of the guage glass 22a of the embodiment last described while the symmetrically opposite similar web 15B of the main frame coacts similarly in the support of the gauge glass 22B. The details of mounting and arrangement of parts will require no redescription, but in this embodiment no reflective surfaces are formed upon the beveled faces 63b and 63B, which correspond to the beveled faces 63 and 63a of the previously described embodiments. The faces 63b and 63B may be blackened, if desired, to increase the absorption of light reflected into the interior by the flat glass faces 25a, 25A.

In this embodiment, light viewed along the line of sight, designated at 66b, is refracted by the liquid-containing portions of the gauge in such manner that the line of sight extends continuously through the gauge, and in and out thereof through the symmetrically opposite beveled faces 61b, 61B, while in areas above the level of the liquid, the light is reflected toward the dark interior of the structure and the reflected line of sight strikes the surface 63b or 63B as the case may be. Such surfaces being unreflective at the angle of observation, and if desired blackened, as previously indicated, the area above the liquid appears dark while the area below the liquid appears bright because the observer, looking into the gauge, as through the face 61b, sees the light entering the gauge through the symmetrically opposite face 61B, or vice versa.

While it will be apparent that the preferred embodiments of the invention herein described are well calculated to fulfill the objects and advantages first above stated, it will be appreciated that the invention is susceptible to variation, modification and change without departing from the fair meaning and proper scope of the appended claims.

What is claimed is:

1. A liquid level gauge comprising a body having an open-sided channel therein, a translucent window element, holding portions carried by the body and engageable with opposed surface portions of the window element for holding the latter in the channel, said body and holding portions leaving a part of the surface of the window element on the open side of the channel exposed to view, a fluid chamber portion opening in one holding portion and facing one side face of the channel in said body and covered by said window element and observable through said window element, said opposed portions of the window element comprising side faces, such side faces of the window element being substantially parallel to the holding portions, one of the side faces of the window element being held in sealing relationship to the fluid chamber, and an edge face forming a part of said window element, said edge face including said part exposed to view and comprising a section lying at an oblique angle to said face which is held in sealing relation to the fluid chamber.

2. A gauge as defined in claim 1 wherein said side faces of the window element are of like shape and proportions and substantially flat, parallel and oppositely aligned, the opposed window-engaging holding portions also being of like shape and proportions and oppositely aligned, at least one of said holding portions comprising gasketing of the hydrostatic pressure-transmitting type, and the perimeter of each of the window-engaging portions substantially coinciding with the perimeter of the window surface engaged thereby.

3. A liquid level gauge comprising a body having an open-sided channel therein, a translucent window element, holding portions carried by the body and engageable with opposed surface portions of the window element for holding the latter in the channel, said body and holding portions leaving a part of the surface of the window element on the open side of the channel exposed to view, a fluid chamber portion opening in one holding portion and facing one side face of the channel in said body and covered by said window element and observable through said window element, said opposed portions of the window element comprising side faces, such side faces of the window element being substantially parallel to the holding portions, one of the side faces of the window element being held in sealing relationship to the fluid chamber, said side faces of the window element being of like shape and proportions and substantially flat, parallel and oppositely aligned, the opposed window-engaging holding portions also being of like shape and proportions and oppositely aligned, and the perimeter of each of the window-engaging portions substantially coinciding with the perimeter of the window side face engaged thereby, said part of the surface of the window element exposed to view including connecting edge portions joining said side faces thereof and extending outwardly beyond the same and lying at oblique angles thereto.

4. A liquid level gauge comprising a body having an open-sided channel therein, a translucent window element, holding portions carried by the body and engageable with opposed surface portions of the window element for holding the latter in the channel, said body and holding portions leaving a part of the surface of the window element on the open side of the channel exposed to view, a fluid chamber portion opening in one holding portion and facing one side face of the channel in said body and covered by said window element and observable through said window element, said opposed portions of the window element comprising side faces, such side faces of the window element being substantially parallel to the holding portions, one of the side faces of the window element being held in sealing relationship to the fluid chamber, said side faces of the window element being of like shape and proportions and substantially flat, parallel and oppositely aligned, the opposed window-engaging holding portions also being of like shape and proportions and oppositely aligned, and the perimeter of each of the window-engaging portions substantially coinciding with the perimeter of the window side face engaged thereby, said part of the surface of the window element exposed to view including connecting edge portions joining said opposed surfaces and extending outwardly beyond the same and lying at oblique angles thereto, said angles substantially corresponding to the shear angle of the material of which said window element is formed.

5. A liquid level gauge comprising a body having an open-sided fluid chamber therein, a transparent window having substantially parallel opposed surfaces, one of which is adapted to overlie the open side of said chamber, the interior of the chamber being observable through said window, means for holding the window in such overlying position including window-engaging portions engageable with the other of said opposed surfaces of the window, and window-engaging portions carried by the body in an area surrounding said open side of the chamber and against which the first-mentioned opposed surface of the window is adapted to bear, said window-engaging portions being of like shape and proportions, oppositely aligned with one another, whereby the forces exerted upon the window by said holding means are substantially entirely in compression, the perimeters of the window-engaging portions substantially coinciding with the perimeters of the respective opposed window surfaces engaged thereby, and at least one of said holding means comprising gasketing of the hydrostatic pressure-transmitting type.

6. A liquid level gauge comprising a body having an open-sided fluid chamber therein, a transparent window having substantially parallel opposed surfaces, one of which is adapted to overlie the open side of said chamber, the interior of the chamber being observable through said window, means for holding the window in such overlying position including window-engaging portions engageable with the other of said opposed surfaces of the window, and window-engaging portions carried by the body in an area surrounding said open side of the chamber and against which the first-mentioned opposed surface of the window is adapted to bear, said window-engaging portions being of like shape and proportions, oppositely aligned with one another, whereby the forces exerted upon the window by said holding means are substantially entirely in compression, the perimeters of the window-engaging portions substantially coinciding with the perimeters of the respective opposed window surfaces engaged thereby, said window having connecting side portions joining said opposed surfaces and extending outwardly beyond the opposed surfaces of the window and lying at oblique angles thereto.

7. A liquid level gauge comprising a body having an open-sided fluid chamber therein, a transparent window having substantially parallel opposed surfaces, one of which is adapted to overlie the open side of said chamber, the interior of the chamber being observable through said window, means for holding the window in such overlying position including window-engaging portions engageable with the other of said opposed surfaces of the window, and window-engaging portions carried by the body in an area surrounding said open side of the chamber and against which the first-mentioned opposed surface of the window is adapted to bear, said window-engaging portions being of like shape and proportions, oppositely aligned with one another, whereby the forces exerted upon the window by said holding means are substantially entirely in compression, said body being of channel form and including a pair of spaced substantially parallel webs, said fluid chamber being defined by portions carried by one of said webs, said holding means being carried by the other of said webs, and said window being held in said channel between the webs.

8. A liquid level gauge comprising a body having an open-sided fluid chamber therein, a transparent window having substantially parallel opposed surfaces, one of which is adapted to overlie the open side of said chamber, the interior of the chamber being observable through said window, means for holding the window in such overlying position including window-engaging portions engageable with the other of said opposed surfaces of the window, and window-engaging portions carried by the body in an area surrounding said open side of the chamber and against which the first-mentioned opposed surface of the window is adapted to bear, said window-engaging portions being of like shape and proportions, oppositely aligned with one another, whereby the forces exerted upon the window by said holding means are substantially entirely in compression, said body being of channel form and incorporating a pair of substantially parallel webs, said fluid chamber being defined by portions carried by one of said webs, a second fluid chamber defined by portions carried by the other of said webs, said chamber-defining portions being of like proportions and oppositely aligned whereby opposite sides of said window are subjected to pressure in said chambers.

9. A liquid level gauge comprising a body having an open-sided fluid chamber therein, a transparent window having substantially parallel opposed surfaces, one of which is adapted to overlie the open side of said chamber, the interior of the chamber being observable through said window, means for holding the window in such overlying position including window-engaging portions engageable with the other of said opposed surfaces of the window, and window-engaging portions carried by the body in an area surrounding said open side of the chamber and against which the first-mentioned opposed surface of the window is adapted to bear, said window-engaging portions being of like shape and proportions, oppositely aligned with one another, whereby the forces exerted upon the window by said holding means are substantially entirely in compression, said body being of channel form and incorporating a pair of substantially parallel webs, said fluid chamber being defined by portions carried by one of said webs, a second fluid chamber defined by portions carried by the other of said webs, said chamber-defining portions being of like proportions and oppositely aligned whereby opposite sides of said window are subjected to pressure in said chambers, said window-engaging portions including yieldable gasketing elements circumscribing said chambers and bearing against the window and adapted to be urged thereagainst by pressure in said chambers, said window having a side connecting said previously mentioned opposed surfaces and including an exposed surface portion through which at least one of said chambers may be viewed.

10. A liquid level gauge comprising a body having an open-sided fluid chamber therein, a transparent window having substantially parallel opposed surfaces, one of which is adapted to overlie the open side of said chamber, the interior of the chamber being observable through said window, means for holding the window in such overlying position including window-engaging portions engageable with the other of said opposed surfaces of the window, and window-engaging portions carried by the body in an area surrounding said open side of the chamber and against which the first-mentioned opposed surface of the window is adapted to bear, said window-engaging portions being of like shape and proportions, oppositely aligned with one another, whereby the forces exerted upon the window by said holding means are substantially entirely in compression, said body being of channel form and incorporating a pair of substantially parallel webs, said fluid chamber being defined by portions carried by one of said webs, a second fluid chamber defined by portions carried by the other of said webs, said chamber-defining portions being of like proportions and oppositely aligned whereby opposite sides of said window are subjected to pressure in said chambers, said window-engaging portions including yieldable gasketing elements circumscribing said chambers and bearing against the opposed surfaces of said window and adapted to be urged thereagainst by pressure in said chambers, said window having a side connecting said previously mentioned opposed surfaces and including an exposed surface portion through which at least one of said chambers may be viewed, said exposed surface portion being arranged at an oblique angle which is substantially perpendicular to a line of sight along which the chamber may be observed.

11. A liquid level gauge comprising a body having an open-sided fluid chamber therein, a transparent window having substantially parallel opposed surfaces, one of which is adapted to overlie the open side of said chamber, the interior of the chamber being observable through said window, means for holding the window in such overlying position including window-engaging portions engageable with the other of said opposed surfaces of the window, and window-engaging portions carried by the body in an area surrounding said open side of the chamber and against which the first-mentioned opposed surface of the window is adapted to bear, said window-engaging portions being of like shape and proportions, oppositely aligned with one another, whereby the forces exerted upon the window by said holding means are substantially entirely in compression, said body being of channel form and incorporating a pair of substantially parallel webs, said fluid chamber being defined by portions carried by one of said webs, a second fluid chamber defined by portions carried by the other of said webs, said chamber-defining portions being of like proportions and oppositely aligned whereby oposie sides of said window are subjected to pressure in said chambers, said window-engaging portions including yieldable gasketing elements circumscribing said chambers and bearing against the opposed surfaces of said window and adapted to be urged thereagainst by pressure in said chambers, said window having a side connecting said previously mentioned opposed surfaces and including an exposed surface portion through which at least one of said chambers may be viewed, said exposed surface portion being arranged at an oblique angle to the opposed surfaces and substantially perpendicular to a line of sight along which the chamber may be observed, said window element also having another inclined connecting side including another surface portion arranged at a similar but opposite oblique angle with respect to the first mentioned opposed window surfaces and provided with a reflective surface.

12. A liquid level gauge comprising a body having an open-sided fluid chamber therein, a transparent window having substantially parallel opposed surfaces, one of which is adapted to overlie the open side of said chamber, the interior of the chamber being observable through said window, means for holding the window in such overlying position including window-engaging portions engageable with the other of said opposed surfaces of the window, and window-engaging portions carried by the body in an area surrounding said open side of the chamber and against which the first-mentioned opposed surface of the window is adapted to bear, said window-engaging portions being of like shape and proportions, oppositely aligned with one another, whereby the forces exerted upon the window by said holding means are substantially entirely in compression, said body being of channel form and incorporating a pair of substantially parallel webs, said fluid chamber being defined by portions carried by one of said webs, a second fluid chamber defined by portions carried by the other of said webs, said chamber-defining portions being of like proportions and oppositely aligned whereby opposite sides of said window are subjected to pressure in said chambers, said window-engaging portions including yieldable gasketing elements circumscribing said chambers and bearing against the window and adapted to be urged thereagainst by pressure in said chambers, said window having a side connecting said previously mentioned opposed surfaces and including an exposed surface portion forming a part through which at least one of said chambers may be viewed, said exposed surface portion being arranged at an oblique angle to the opposed surfaces and substantially perpendicular to a line of sight along which the chamber may be observed, said window element also having another inclined connecting side including another surface portion arranged at a similar but opposite oblique angle with respect to the first mentioned opposed window surfaces and provided with a reflective surface, said oblique surfaces lying substantially at the natural shear angle of the material of which said window element is formed.

13. In a liquid level gauge, a body portion of substantially S-section including a central web, a pair of bight sections projecting laterally outwardly in opposite directions from the opposite longitudinal edges of said central web, side webs projecting in opposite directions from the edge extremities of said bight sections, and lying parallel to one another and to the central web, fluid chamber portions extending longitudinally of and carried by said central web, and a pair of window elements, one arranged on each side of said central web, each window element being held between said central web and one of the side webs.

14. A gauge as defined in claim 13 wherein said fluid chamber portions include communicating parts open on both sides of said central web whereby light may be transmitted through both window elements and the chamber portions.

15. In a liquid level gauge, a body portion of substantially S-section including a central web, a pair of bight sections projecting laterally outwardly in opposite directions from the opposite longitudinal edges of said central web, side webs projecting in opposite directions from the edge extremities of said bight sections, and lying parallel to one another and to the central web, fluid chamber portions extending longitudinally of and carried by said central web, and a pair of window elements, one arranged on each side of said central web, each window element being held between said central web and one of the side webs, each window element having a surface portion overlying a part of said chamber portions and each window element having another surface portion defining a viewing surface lying at an oblique angle of less than 90° to said overlying surface portion.

16. A gauge as defined in claim 13 wherein said fluid chamber portions include communicating parts open on both sides of said central web whereby light may be transmitted through both window elements and the chamber portions, each window element having a surface portion overlying a part of said chamber portions and each window element having another surface portion defining a viewing surface lying at an oblique angle of less than 90° to said overlying surface portion.

17. A gauge as defined in claim 13 wherein said fluid chamber portions include communicating parts open on both sides of said central web whereby light may be transmitted through both window elements and the chamber portions, each window element having a surface portion overlying a part of said chamber portions and each window element having another surface portion defining a viewing surface lying at an oblique angle of less than 90° to said overlying surface portion, a portion of the window element remote from the viewing surface and the overlying surface being dark.

18. A window element for liquid level gauges and the like having substantially parallel surface portions and having edge portions beveled substantially at the shear angle of the material of which said element is formed, at least one of said beveled edge portions having a width which is a substantial proportion of the width of one of the parallel surface portions and lying at an acute angle to such surface portion.

19. A window element for liquid level gauges and the like having substantially parallel surface portions of like size and configuration and oppositely aligned with one another and having edge portions surrounding each of said surface portions beveled substantially at the shear angle of the material of which said element is formed, at least one of said beveled edge portions having a width which is a substantial proportion of the width of one of the parallel surface portions and lying at an acute angle to such surface portion.

20. In a liquid level gauge, a body, an open-sided fluid chamber in the body, a window element having a surface portion adapted to overlie the open side of said chamber and having an opposed surface portion of substantially the same size and configuration as the first-mentioned surface portion, side portions joining said surface portions, said side portions including angular portions joined at the edges to peripheral edges of said surface portions and extending outwardly and convergently therefrom, and means for securing the window element to the body while leaving at least a part of the side portion closest to said opposed surface unobstructed whereby the chamber may be viewed by looking angularly through said last-mentioned side portion and first-mentioned surface portion.

21. A gauge as defined in claim 20 wherein light propagated along a line of sight through said last-mentioned side portion is reflected internally by said first-mentioned surface portion when said first-mentioned surface portion is exposed to some materials, but is refracted through said first-mentioned surface when said first-mentioned surface is in engagement with other materials.

22. In a gauge as defined in claim 8, cross-connecting portions providing pressure conductive communication between and operative to equalize the pressures in said chambers.

23. In a gauge as defined in claim 12, cross-connecting portions providing pressure conductive communication between and operative to equalize the pressures in said chambers.

References Cited in the file of this patent

UNITED STATES PATENTS

| Number | Name | Date |
|---|---|---|
| 2,201,542 | Kinderman | May 21, 1940 |
| 2,240,988 | Hortel | May 6, 1941 |
| 2,566,570 | Johnson | Sept. 4, 1951 |
| 2,579,719 | Yoder | Dec. 26, 1951 |

FOREIGN PATENTS

| Number | Country | Date |
|---|---|---|
| 567,983 | France | Dec. 14, 1923 |
| 120,896 | Switzerland | June 16, 1927 |